United States Patent
Takano et al.

(10) Patent No.: US 9,136,727 B2
(45) Date of Patent: Sep. 15, 2015

(54) BATTERY CHARGING CONTROL DEVICE

(75) Inventors: Atsushi Takano, Sagamihara (JP);
Kazuhiko Okino, Yokohama (JP);
Naoki Yamamoto, Kawasaki (JP);
Shinsuke Higuchi, Isehara (JP); Takashi Iimori, Tokyo (JP); Tsutomu Soga, Machida (JP); Hayato Nagakura, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 276 days.

(21) Appl. No.: 13/817,769

(22) PCT Filed: Mar. 1, 2012

(86) PCT No.: PCT/JP2012/055206
§ 371 (c)(1),
(2), (4) Date: Feb. 19, 2013

(87) PCT Pub. No.: WO2012/124487
PCT Pub. Date: Sep. 20, 2012

(65) Prior Publication Data
US 2013/0147424 A1 Jun. 13, 2013

(30) Foreign Application Priority Data
Mar. 11, 2011 (JP) .................................. 2011-054088

(51) Int. Cl.
*H02J 7/00* (2006.01)
*H01M 10/44* (2006.01)
*H01M 10/48* (2006.01)
*H01M 10/63* (2014.01)
*H01M 10/615* (2014.01)
*H01M 10/66* (2014.01)

(52) U.S. Cl.
CPC ............. *H02J 7/007* (2013.01); *H01M 10/443* (2013.01); *H01M 10/486* (2013.01); *H01M 10/615* (2013.01); *H01M 10/63* (2013.01); *H01M 10/66* (2013.01)

(58) Field of Classification Search
CPC ............ H02J 7/00; H02J 7/007; H02J 7/0075
USPC .................................................. 320/107, 162
See application file for complete search history.

(56) References Cited

U.S. PATENT DOCUMENTS

| | | | |
|---|---|---|---|
| 6,664,764 | B1 | 12/2003 | Odaohhara |
| 2009/0114463 | A1* | 5/2009 | DeVault ..................... 180/65.29 |
| 2010/0292855 | A1* | 11/2010 | Kintner-Meyer ............ 700/291 |

FOREIGN PATENT DOCUMENTS

| | | |
|---|---|---|
| JP | 07-067265 A | 3/1995 |
| JP | 8-115747 A | 5/1996 |

(Continued)

OTHER PUBLICATIONS

Chinese Office Action, Oct. 21, 2014, 6 pages.

(Continued)

*Primary Examiner* — Mohammed Alam
(74) *Attorney, Agent, or Firm* — Foley & Lardner LLP

(57) ABSTRACT

When warming-up of a battery is in progress (S12), a battery charge state at the warming-up start time of the battery is set to a battery hold capacity $SOC_{hold}$ (S14, S15), and a charge power for the battery is controlled so that a battery charge state SOC is kept at $SOC_{hold}$. When a present time is in a timer charge reservation time (S11), the charge power for the battery is controlled so that SOC becomes a full charge state $SOC_{full}$ (S17). Even if SOC has a tendency to temporarily decrease due to a rapid increase of heater consumption power just after start of warming-up of the battery, by keeping SOC at $SOC_{hold}$ (SOC=$SOC_{hold}$), SOC can reach a full charge state as intended during the timer charge reservation time. A proportion of charge using low-priced midnight power is increased to a maximum then running cost can be suppressed.

2 Claims, 4 Drawing Sheets

(56) References Cited

FOREIGN PATENT DOCUMENTS

| | | |
|---|---|---|
| JP | 2000-040536 A | 2/2000 |
| JP | 2010-246176 A | 10/2010 |
| JP | 2010-246320 A | 10/2010 |

OTHER PUBLICATIONS

Japanese Office Action, Nov. 25, 2014, 2 pages.
Extended European Search Report, Aug. 6, 2014, 6 pages.

* cited by examiner

BATTERY CHARGING CONTROL DEVICE

TECHNICAL FIELD

The present invention relates to a battery charging control device, used for a system that has a battery whose charge time can be designated and a power load which is operated by power supplied through a charging power system of the battery when a predetermined condition is satisfied.

BACKGROUND ART

As such system having the battery and the power load, as disclosed, for instance, in Patent Document 1, it is a battery warming-up system having a battery of an electric vehicle and a heater that controls a temperature of the battery by warming up the battery when the battery is unused.

It is conceivable that the battery mounted in the electric vehicle is used in a cold district, and a battery electrolyte might freeze while the battery is unused.

When the temperature of the battery lowers, although a battery charge state SOC does not lower, a usable input/output power for the battery decreases due to an increase of an internal resistance. Further, when the battery electrolyte freezes, the usable input/output power of the battery finally becomes 0 (zero), then in a case of the electric vehicle that uses the battery as a travelling energy source, the electric vehicle gets into a travel-impossible state.

Thus, a battery temperature control device, which controls the battery temperature by warming up the battery by the heater before the battery temperature lowers to a temperature that causes a state in which such problem of the usable input/output power of the battery occurs, is required.

The battery warming-up system disclosed in Patent Document 1, for example when controlling the battery temperature by warming up the battery by the heater for such sake, performs the control as follows.

That is, when the battery temperature lowers below a predetermined temperature, the battery warming-up system warms up the battery by operating the heater. However, at the same time as this warming-up, if the battery charge state is less than a predetermined value, the battery warming-up system further performs charge of the battery, and the battery is warmed up also by heat generated by this battery charge.

In the case of a technique disclosed in Patent Document 1, however, when the battery temperature lowers below the predetermined temperature, if the battery charge state is less than the predetermined value, the battery charge is also performed. Because of this, at this time, as long as the battery temperature is lower than the predetermined temperature, the battery is continuously charged until the battery charge state is equal to or greater than the predetermined value.

Here, regarding the charge of the battery, it is preferable to charge the battery using low-priced midnight power (late-night off-peak electricity) from the viewpoint of reduction of a running cost. For instance, in order to respond to such request, or in order that the battery is in a fully charged state at a departure time, it is desirable that a time of the battery charge can be designated or nominated.

In a case where the battery warming-up system of Patent Document 1 is applied to the vehicle in which the time of the battery charge can be designated, the following problems arise.

That is, as described above, since the battery warming-up system of Patent Document 1 is a system that, when the battery temperature lowers below the predetermined temperature and also the battery charge state is less than the predetermined value, charges the battery so as to increase the battery charge state, the battery charge for increasing the battery charge state is carried out at a time except the above battery charge designated time.

When the battery charge for increasing the battery charge state is carried out at the time except the battery charge designated time, for instance, such problems that the battery charge using the low-priced midnight power is not performed and at least relatively great proportion of a charging amount of the battery is covered by high-priced power other than the midnight power then the running cost increases arise.

CITATION LIST

Patent Document

Patent Document 1: Japanese Patent Provisional Publication Tokkai No. 2000-040536

SUMMARY OF THE INVENTION

An object of the present invention is to provide a battery charging control device that is capable of avoiding the above problems about the running cost by suppressing the battery charge for increasing the battery charge state to a minimum at the time except the battery charge designated time.

To achieve this object, the battery charging control device according to the present invention is configured as follows.

First, the battery charging control device as a prerequisite for the present invention will be explained. The battery charging control device has a battery that can be charged by a designated charge time and a power load that is connected to a charging power system of the battery and is operated by a power supplied through the charging power system when a predetermined condition is satisfied.

The present invention is characterized in that the battery charging control device is provided with a charge power changing section that, during operation of the power load, changes a charge power for the battery according to whether or not a present time is in the designated charge time.

According to the battery charging control device of the present invention, during operation of the power load by the power supplied through the charging power system, the battery charging control device changes the charge power for the battery according to whether or not the present time is in the designated charge time. Thus, by proper setting of the charge power when the present time is in the designated charge time and the charge power when the present time is not in the designated charge time, the battery charge to increase a battery charge state is suppressed at a time except the designated charge time, and the battery charge to increase the battery charge state can be carried out mainly during the designated charge time. An intention or aim of the setting of the charge time, for instance, reduction or suppression of the running cost, can be therefore achieved.

DESCRIPTION OF EMBODIMENTS

In the following description, an embodiment of the present invention will be explained with reference to the drawings.

Figure 1:
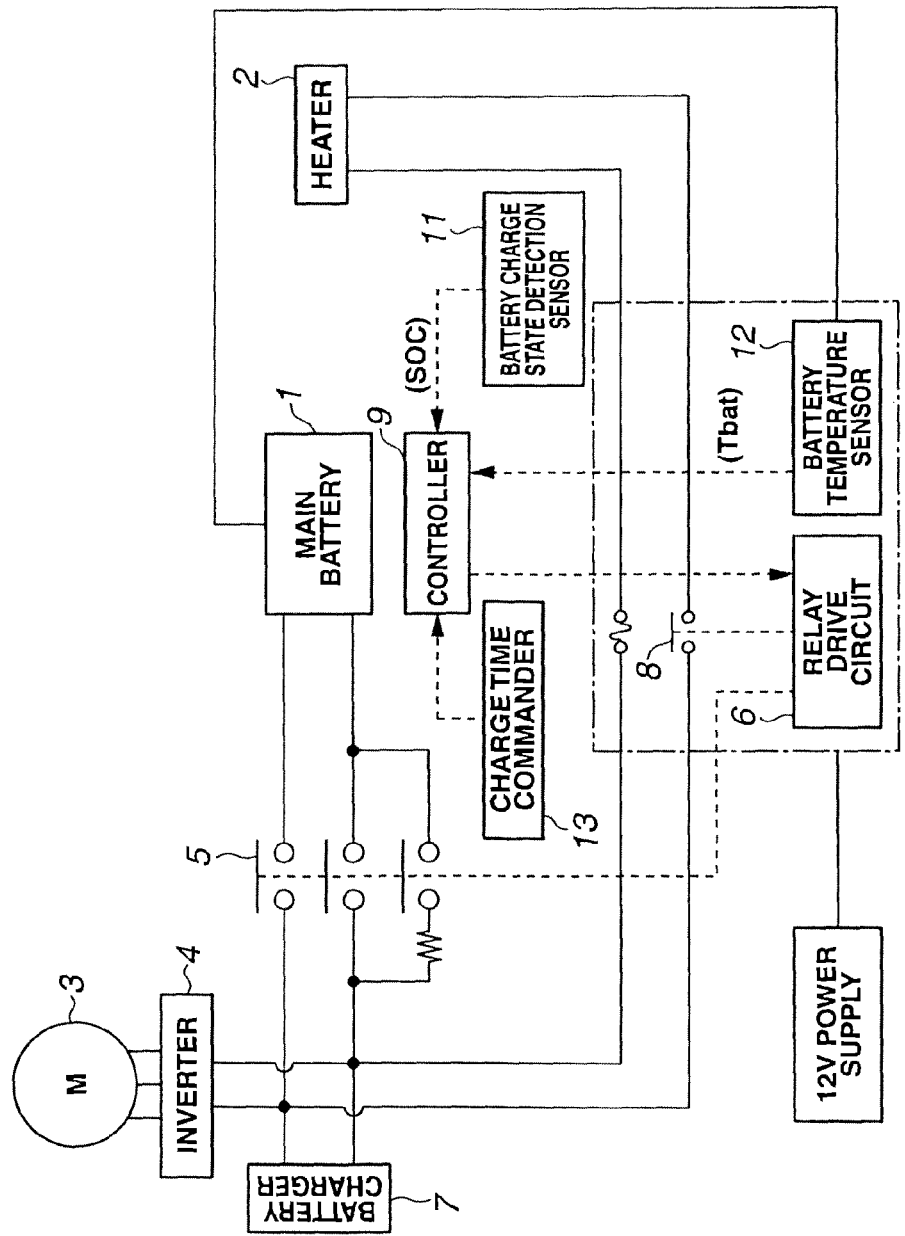
FIG. 1 is a control system diagram schematically showing a battery charging control device of an embodiment of the present invention, together with a battery temperature control device.

FIG. 1 is a control system diagram of a battery charging control device of the embodiment of the present invention. In the present embodiment, this battery charging control device is a device for charging a main battery 1 used for travel of an electric vehicle such as an electric car and a hybrid vehicle.

The main battery 1 is a large-capacity battery provided for drive of a drive motor. The large-capacity battery is formed, as an integral component, so that a plurality of battery shells are stacked (or arranged) as a unit of a battery module and a plurality of the battery modules are arranged as one set.

In FIG. 1, a reference sign 2 denotes a heater to perform a temperature control of the battery 1, and corresponds to a power load in the present invention. This heater 2 is a heater that is provided close to the battery module and set along a stack direction of the battery shell of the battery module then warms up the battery 1.

In FIG. 1, a reference sign 3 denotes an electric motor used for drive of the travel of the electric vehicle. This electric motor 3 is electrically connected to the battery 1 through an inverter 4.

A main relay switch 5 is inserted on an electric line between the inverter 4 and the battery 1. This main relay switch 5 is a switch that opens/closes in synchronization with or in response to an ignition switch (not shown) of the electric vehicle through a drive controller (also not shown). The main relay switch 5 closes when the ignition switch is ON, and the main relay switch 5 opens when the ignition switch is OFF.

During close of the main relay switch 5 in synchronization with ON of the ignition switch, a DC power from the battery 1 is converted from DC to AC by the inverter 4, and is outputted to the electric motor 3 under a control of the inverter 4, then the electric vehicle can travel by drive of the electric motor 3.

During open of the main relay switch 5 in synchronization with OFF of the ignition switch, the DC power from the battery 1 is not outputted to the electric motor 3, then the electric vehicle can be held in a vehicle stop state by halt of the electric motor 3.

A battery charger 7 is connected and provided between a DC side of the inverter 4 and the main relay switch 5. When this battery charger 7 is connected to an external power supply of a charging station or of a battery charging facility provided at a home, the main relay switch 5 is closed by a charge controller (not shown), thereby charging the battery 1 by the external power supply.

The temperature control and a charge control of the battery 1 will be explained below.

As shown in FIG. 1, the heater 2 provided close to the battery module along the stack direction of the battery shell, to perform the temperature control of the battery 1 as mentioned above, is electrically connected between the DC side of the inverter 4 and the main relay switch 5. A heater switch 8 is inserted on an electric line between this connection part and the heater 2.

Open/close of the heater switch 8 is controlled, through a relay drive circuit 6, by a controller 9 that governs the temperature control and the charge control of the battery 1.

Further, this controller 9 also controls open/close of the main relay switch 5 through the relay drive circuit 6 during open of the main relay switch 5 in synchronization with OFF of the ignition switch and during close of the main relay switch 5 in synchronization with the connection of the battery charger 7 to the external power supply.

Here, during open of the main relay switch 5 in synchronization with OFF of the ignition switch, the controller 9 closes also the main relay switch 5 in synchronization with "close" of the heater switch 8 then turns the heater 2 ON, and the controller 9 opens also the main relay switch 5 in synchronization with "open" of the heater switch 8 then turns the heater 2 OFF.

Further, during close of the main relay switch 5 in synchronization with the connection of the battery charger 7 to the external power supply, with the proviso that the heater switch 8 is in a "close" state, the controller 9 performs the open/close control of the main relay switch 5 then executes the aftermentioned battery charge control which is an aim of the present invention. In addition, in a case where the heater switch 8 is "open", the controller 9 opens the main relay switch 5, and the battery charge is not carried out.

In order to perform the ON/OFF control of the heater 2 (ON/OFF of the battery temperature control) and the charge control of the battery 1 through the above close/open of the heater switch 8 and the main relay switch 5, the controller 9 inputs a signal from a battery charge state detection sensor 11 that detects a battery charge state SOC of the battery 1, a signal from a battery temperature sensor 12 that senses a temperature Tbat of the battery 1 and a signal from a charge time commander 13 by which a user of the vehicle operates to set a battery charge time between a battery charge start time and a battery charge end time of the battery 1.

The charge time commander 13 is a section that is provided in order for the user of the vehicle to set the battery charge time for the sake of suppressing a running cost by full charge of the battery 1 using low-priced midnight power (late-night off-peak electricity) and for the sake of fully charging the battery 1 just at a departure time so that mileage or travel distance becomes a maximum.

The controller 9 performs, on the basis of these input information, the battery temperature control by executing a control program (not shown), and also performs the charge control of the battery 1 by executing a control program shown in FIG. 2 as follows.

First, an outline of the temperature control of the battery 1, which is disconnected from the electric motor 3 (the inverter 4) and is in an unused state by the ignition switch OFF ("open" of the main relay switch 5), will be explained.

Regarding battery 1 that is in the unused state, its usable input/output power becomes 0 (zero) by the fact that a battery electrolyte freezes especially in a cold district, then the electric vehicle gets into a travel-impossible state. Thus, there is a need to warm up the battery 1 by operating the heater 2 as necessary and to control the temperature of the battery 1.

Figure 3:
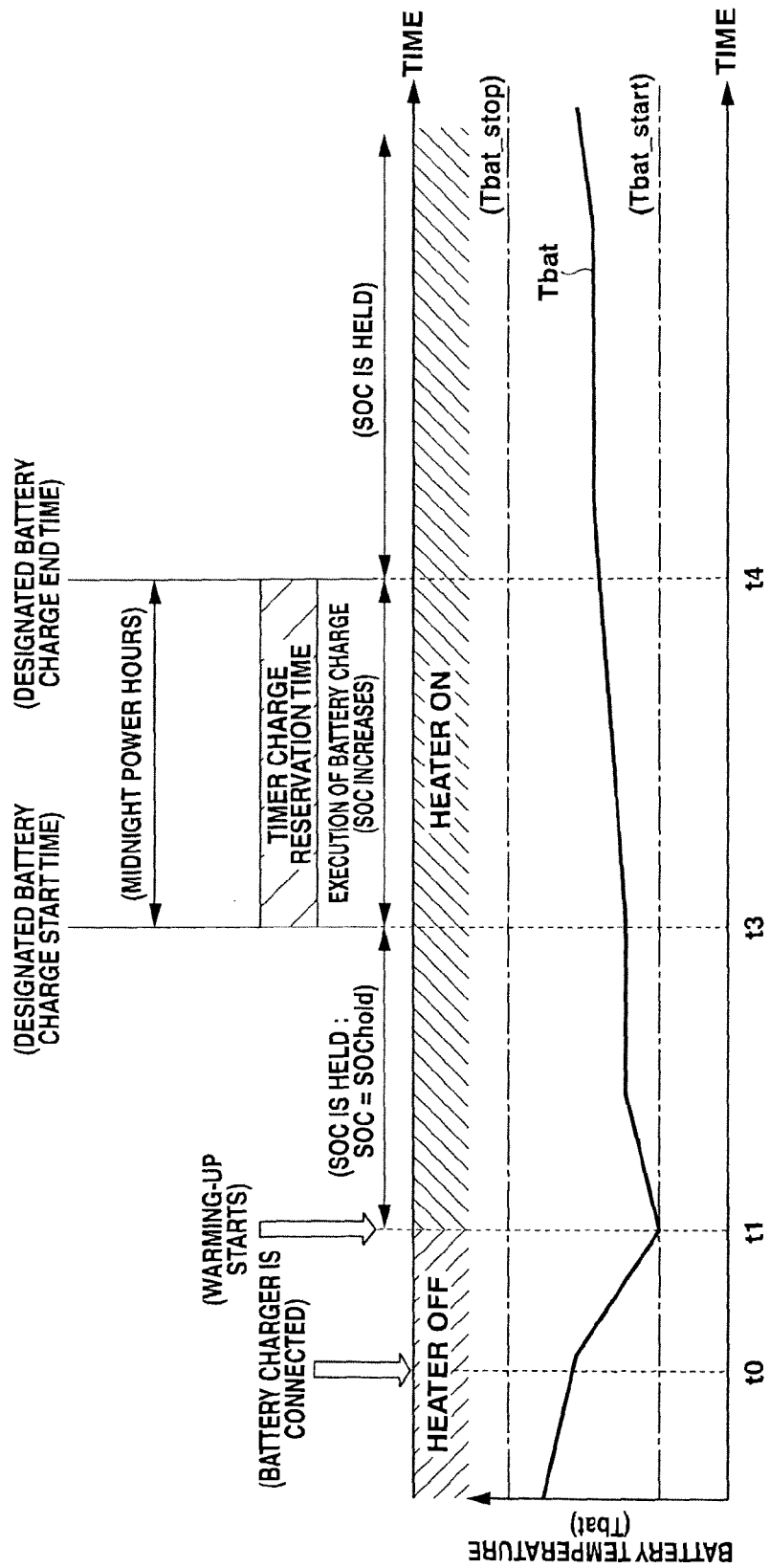
FIG. 3 is an operation time chart of the battery charging control program shown in FIG. 2.

Because of this, during the ignition switch OFF, the battery temperature Tbat is checked whether the battery temperature Tbat is less than a warming-up start temperature Tbat_start (e.g. about −17° C.) shown as an example in FIG. 3 or is equal to or higher than a warming-up stop temperature Tbat_stop (e.g. −10° C.) also shown as an example in FIG. 3.

Before time t1 in FIG. 3 at which the battery temperature Tbat lowers below the warming-up start temperature Tbat_start (Tbat<Tbat_start), since there is no worry of immediate freeze of the battery electrolyte, the controller 9 turns the heater 2 OFF by opening the heater switch 8 and the main relay switch 5, then the warming-up of the battery 1 is not carried out.

At time t1 in FIG. 3 at which the battery temperature Tbat becomes less than the warming-up start temperature Tbat_start (Tbat<Tbat_start), the controller 9 turns the heater 2 ON by closing the heater switch 8 and the main relay switch 5, then the warming-up of the battery 1 is carried out.

Afterwards, the controller 9 checks whether or not the battery temperature Tbat becomes equal to or higher than the warming-up stop temperature Tbat_stop at every lapse of a predetermined time. As shown in FIG. 3, as long as the battery temperature Tbat is not "Tbat≥Tbat_stop" after time t1, the controller 9 continues turning the heater 2 ON by "close" of the heater switch 8 and the main relay switch 5, then the warming-up of the battery 1 is continued.

Then when the battery temperature Tbat becomes "Tbat≥Tbat_stop", the controller 9 turns the heater 2 OFF by "open" of the heater switch 8 and the main relay switch 5, then the warming-up of the battery 1 is terminated.

By repetition of the above cycle, the battery 1 is not held in the state of "Tbat<Tbat_start", it is therefore possible to prevent the vehicle from getting into the travel-impossible state caused by the freeze of the battery electrolyte.

Further, when the battery temperature Tbat becomes "Tbat≥Tbat_stop", since the heater 2 is turned OFF and the warming-up of the battery 1 is terminated, it is possible to avoid waste of power consumption due to unnecessary "ON" of the heater 2.

Next, the charge control of the battery 1 performed by the controller 9 will be explained with reference to FIG. 2.

Figure 2:
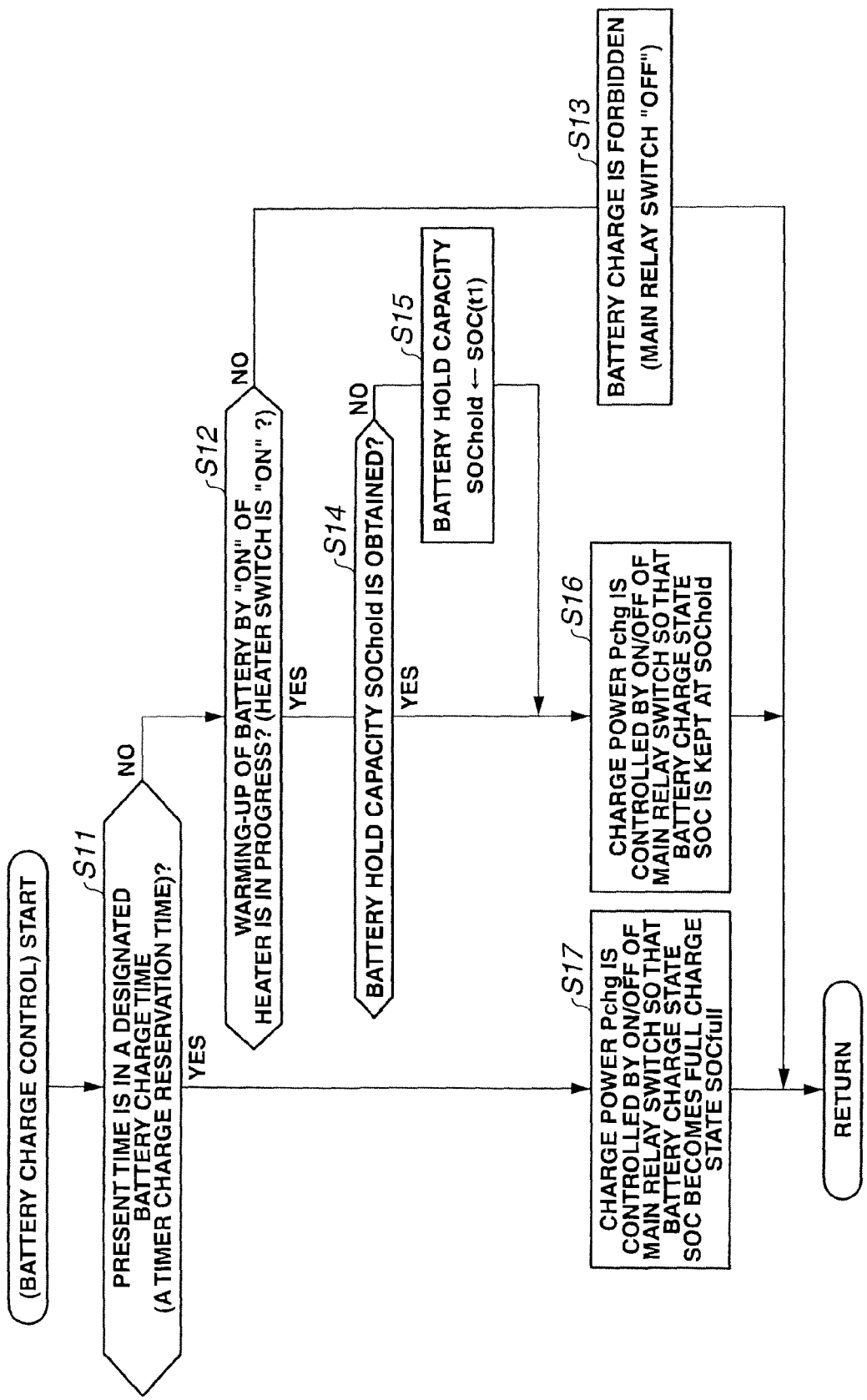
FIG. 2 is a flow chart of a battery charging control program executed by a controller shown in FIG. 1.

The control program of FIG. 2 is executed from a time when the main relay switch 5 is closed and the battery charger 7 (or the vehicle) is in a charge-possible state by the fact that the battery charger 7 is connected to the external power supply of the charging station or of the battery charging facility provided at the home at time t0 shown in FIG. 3.

At step S11, a check is made as to whether or not a present time is in a timer charge reservation time (or a timer charge preset time) between the battery charge start time and the battery charge end time designated by the charge time commander 13.

In FIG. 3, the designated battery charge start time is denoted as time t3 after time t1, and the designated battery charge end time is denoted as time t4.

When judging that the present time is not in the timer charge reservation time (t3~t4) at step S11, at step S12, a check is made as to whether or not the warming-up of the battery 1 is in progress by "ON" or "OFF" of the heater switch 8.

Here, in a battery charger connecting state after time t0 shown in FIG. 3, since a power from the battery charger 7 exists, if the heater switch 8 is ON, the heater 2 can be operated regardless of ON/OFF of the main relay switch 5. Therefore, at step S12, as described above, it is possible to check whether or not the warming-up of the battery 1 is in progress by only "ON" or "OFF" of the heater switch 8.

Figure 4:
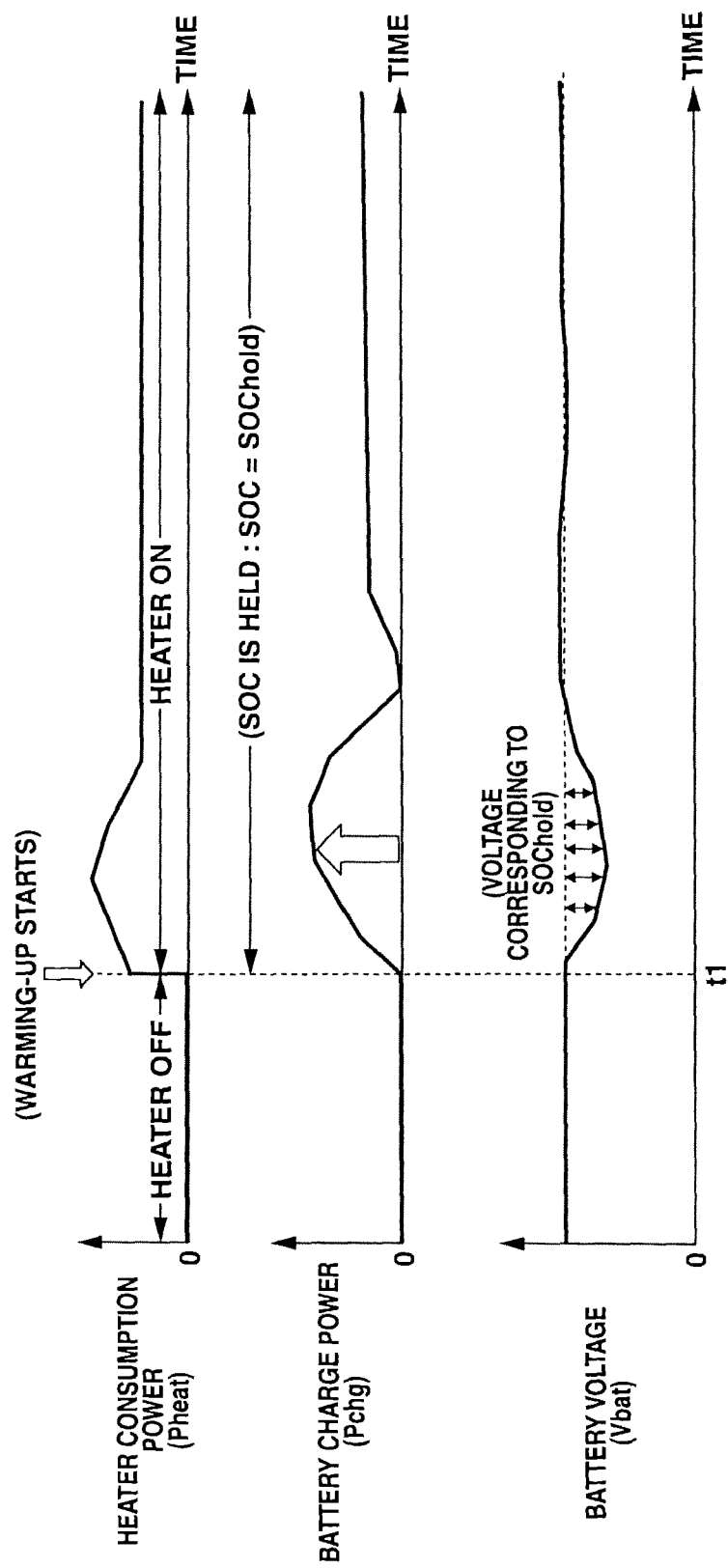
FIG. 4 shows operation time charts shown with an axis of time between a battery warming-up start time t1 and a designated battery charge start time t3 in FIG. 3 enlarged.

When the warming-up of the battery 1 is not in progress, which is a state like a state before a warming-up start time t1 shown in FIG. 3, at step S13, the charge of the battery 1 is forbidden and is not carried out by "OFF" of the main relay switch 5, which is understood from a battery charge power $P_{chg}=0$ before the warming-up start time t1 shown in FIG. 4.

When judging that the warming-up of the battery 1 by ON of the heater 2 is in progress at step S12, at step S14, a check is made as to whether a battery hold capacity $SOC_{hold}$ to be obtained at a warming-up start time (in FIG. 3, t1) is already obtained or not.

When the battery hold capacity $SOC_{hold}$ is not obtained yet, after a battery charge state SOC (t1) at the warming-up start time (in FIG. 3, t1) is set to the battery hold capacity $SOC_{hold}$ at step S15, the control routine proceeds to step S16. When the battery hold capacity $SOC_{hold}$ is already obtained by an execution of step S15, the routine skips this step S15 and proceeds to step S16.

Step S16 is a step or a section that corresponds to a charge power changing step or section (a charge power changing means) of the present invention. At this step S16, the charge power $P_{chg}$ for the battery 1 (the charge power $P_{chg}$ supplied to the battery 1) is controlled by ON/OFF of the main relay switch 5 so that the battery charge state SOC is kept at the battery hold capacity $SOC_{hold}$.

This control can be realized by performing the following manner. If $SOC<SOC_{hold}$, by ON of the main relay switch 5, the charge power is supplied to the battery 1 from the battery charger 7. When the battery charge state SOC becomes "$SOC=SOC_{hold}$", by OFF of the main relay switch 5, the charge power is not supplied to the battery 1 from the battery charger 7.

When the charge power $P_{chg}$ for the battery 1 is controlled so that the battery charge state SOC is kept at the battery hold capacity $SOC_{hold}$ as described above, the following effects can be obtained.

FIG. 4 shows operation time charts shown with an axis of time between the battery warming-up start time t1 and the designated battery charge start time t3 in FIG. 3 enlarged more than FIG. 3. Just after time t1, a heater consumption power $P_{heat}$ rapidly increases, and the battery charge state SOC temporarily becomes worse or decreases by an amount equivalent to the increase of the heater consumption power $P_{heat}$, which is understood from a decreasing tendency shown by a solid line of a battery voltage $V_{bat}$ just after time t1.

If this decrease state (this worse state) of the battery charge state SOC is left undone, the battery charge state SOC can not reach a full charge state as intended between the timer charge reservation time t3~t4 of FIG. 3. Because of this, there arise problems that a proportion of the charge using the low-priced midnight power decreases then the running cost increases, and the battery 1 is not in a fully charged state at a travel start time after the battery charge end of time t4 then the travel distance is shortened.

Here, in the present embodiment, at step S16, the charge power $P_{chg}$ for the battery 1 is increased so that the battery charge state SOC is kept at the battery hold capacity $SOC_{hold}$, as shown by the operation time charts just after the warming-up start time t1 in FIG. 4. Consequently, as shown by a broken line of the battery voltage $V_{bat}$ in FIG. 4, the battery voltage $V_{bat}$ can be kept at a level corresponding to the battery hold capacity $SOC_{hold}$ even just after time t1.

Accordingly, the battery charge to increase the battery charge state SOC more than the level of time t1 is not carried out at a time except the timer charge reservation time t3~t4 of FIG. 3. As a consequence, the battery charge state SOC can reach the full charge state as intended between the timer charge reservation time t3~t4 of FIG. 3, and the proportion of the charge using the low-priced midnight power is increased to a maximum then the running cost can be suppressed. Further, the battery 1 surely becomes the fully charged state at the travel start time after the battery charge end of time t4 then the travel distance can extend to a maximum.

In FIG. 2, at step S11, when judging that the present time is in the timer charge reservation time between the battery charge start time t3 (see FIG. 3) and the battery charge end time t4 (see FIG. 3), the control routine proceeds to step S17.

This step S17 is a step or a section that corresponds to a charge power changing step or section (a charge power changing means) of the present invention. At step S17, the charge power $P_{chg}$ for the battery 1 is controlled by ON/OFF of the main relay switch 5 so that the battery charge state SOC becomes a full charge state $SOC_{full}$.

This control can be realized by performing the following manner. If $SOC<SOC_{full}$, by ON of the main relay switch 5, the charge power is supplied to the battery 1 from the battery charger 7. When the battery charge state SOC becomes "$SOC=SOC_{full}$", by OFF of the main relay switch 5, the charge power is not supplied to the battery 1 from the battery charger 7.

When carrying out the charge to the battery 1 so that the battery charge state SOC becomes the full charge state $SOC_{full}$ between the timer charge reservation time t3~t4 as described above, an intention or aim of the setting of the timer charge reservation time can be surely achieved. The power consumed for the full charge is then fully covered by the low-priced midnight power, and it is possible to suppress the running cost.

According to the battery charging control device described in the present embodiment above, as shown in FIGS. 3 and 4, during the warming-up of the battery 1 by the operation of the heater 2 (the power load) after time t1, according to whether or not the present time is in the timer charge reservation time (t3~t4), when the present time is not in the timer charge reservation time (t3~t4), the charge power $P_{chg}$ for the battery 1 is controlled so that the battery charge state SOC is kept at the battery hold capacity $SOC_{hold}$ that is the battery charge state SOC (t1) of the warming-up start time t1. Therefore, as shown in FIG. 4, even if the heater consumption power $P_{heat}$ rapidly increases just after the warming-up start time t1 and the battery charge state SOC has a tendency to temporarily become worse or decrease by the amount equivalent to the increase of the heater consumption power $P_{heat}$ as shown by the decreasing tendency indicated by the solid line of the battery voltage $V_{bat}$ just after time t1, the battery voltage $V_{bat}$ just after time t1 can be kept at the level corresponding to the battery hold capacity $SOC_{hold}$ as shown by the broken line of the battery voltage $V_{bat}$ in FIG. 4.

Hence, the battery charge to increase the battery charge state SOC more than the level of time t1 is not carried out at the time except the timer charge reservation time t3~t4 of FIG. 3. As a consequence, the battery charge state SOC can reach the full charge state as intended between the timer charge reservation time t3~t4 of FIG. 3, and the proportion of the charge using the low-priced midnight power is increased to the maximum then the running cost can be suppressed. Further, the battery 1 surely becomes the fully charged state at the travel start time after the battery charge end of time t4 then the travel distance can extend to the maximum.

In addition, in the case where the present time is in the timer charge reservation time (t3~t4), the charge power $P_{chg}$ for the battery 1 is controlled so that the battery charge state SOC becomes the full charge state $SOC_{full}$. The power consumed for the full charge is then fully covered by the low-priced midnight power, and it is consequently possible to suppress the running cost.

The invention claimed is:

1. A battery charging control device having a battery that can be charged by a designated charge time and a power load that is connected to a charging power system of the battery and is operated by a power supplied through the charging power system when a predetermined condition is satisfied, the battery charging control device comprising:
   a charge power changing section that, during operation of the power load, changes a charge power for the battery according to whether or not a present time is in the designated charge time,
   wherein the charge power changing section changes, according to whether or not the present time is in designated charge time, the charge power for the battery between a fully-chargeable charge power by which the battery can be fully charged and a charge-state-holding charge power to keep the battery at a predetermined battery charge state that is smaller than a full charge state,
   wherein:
   when the present time is not in the designated charge time, the charge power changing section sets the charge power for the battery to the charge-state-holding charge power, and
   when the present time is in the designated charge time, the charge power changing section sets the charge power for the battery to the fully-chargeable charge power,
   wherein the power load is a heater that controls a temperature of the battery by warming up the battery then the battery temperature becomes less than a predetermined temperature, the predetermined condition being the battery temperature being less than the predetermined temperature.

2. The batter charging control device as claimed in claim 1, wherein:
   the charge-state-holding charge power is a charge power that is necessary for the battery to be kept at a battery charge state of a time of a power load operation start.

* * * * *